Dec. 15, 1959     W. S. GLOVER ET AL     2,917,197
REINFORCED GLASS AEROSOL CONTAINERS
Filed Nov. 19, 1956
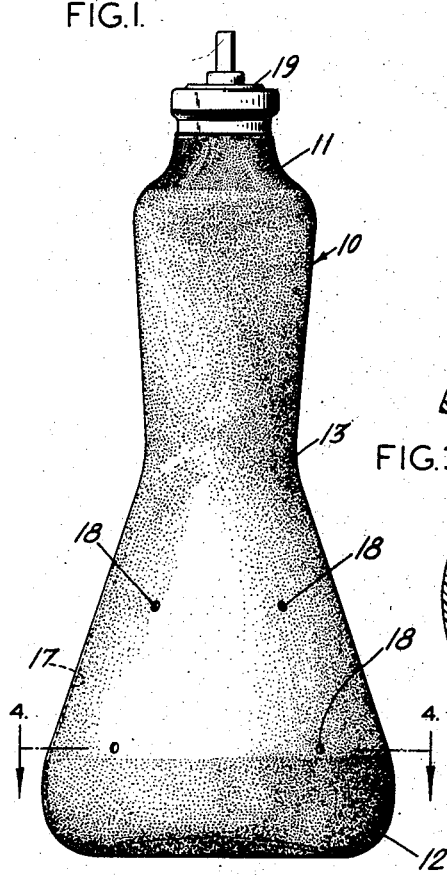
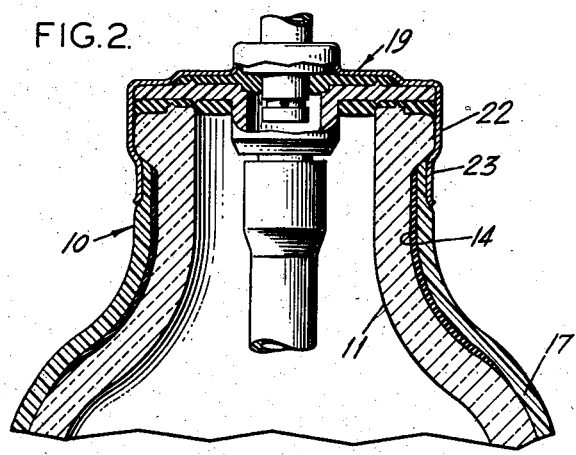
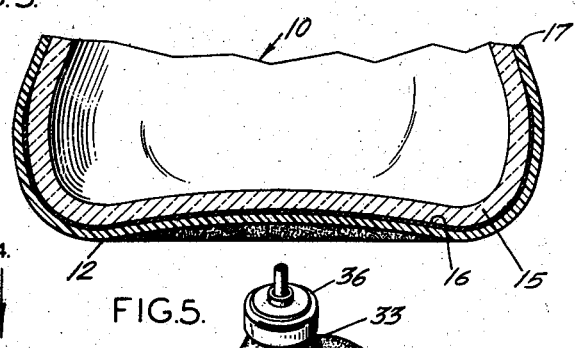
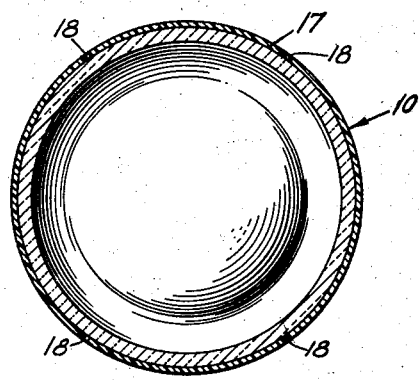
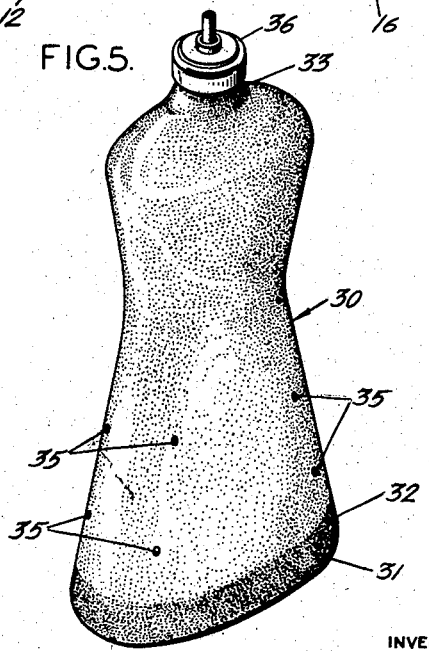
INVENTORS:
WILLIAM S. GLOVER
PAUL A. ROUSH
JOSEPH F. WEST
ALFONSE F. BUDZILEK
BY *Howson & Howson* ATTYS

United States Patent Office 2,917,197
Patented Dec. 15, 1959

2,917,197

REINFORCED GLASS AEROSOL CONTAINERS

William S. Glover, Vineland, Joseph F. West, Millville, Paul A. Roush, Vineland, and Alfonse E. Budzilek, Millville, N.J., assignors to Wheaton Glass Company, Millville, N.J., a corporation of New Jersey Application November 19, 1956, Serial No. 622,966

3 Claims. (Cl. 215—12)

This invention relates to the art of aerosol containers. In a number of regards it embodies the features and advantages of the copending application of Joseph F. West, Serial Number 486,565, filed February 7, 1955, now Patent Number 2,906,462, and provides improvements in detail over those features.

As pointed out in said West application, there are certain marked advantages in the use of glass in containers of this type, from which liquids are to be projected through dispensing valves under the pressure of a volatile propellant. These include better appearance and customer appeal and maintenance of both the product and container against deterioration. In spite of these obvious theoretical advantages, glass was previously not acceptable as a substitute for metal in containers of this type, because of the hazard of flying glass under the impelling force of the volatile propellant, in case of accidental breakage of the bottle.

The inventions described and claimed in the aforesaid West application provided a commercially acceptable solution for this problem and made it possible to attain the obvious advantages of use of glass in these containers, while minimizing the flying glass hazard. The primary object of the present invention has been to reduce this hazard still further, by eliminating the chance of breakage of the bottle in such manner as to create this hazard, even in the unusual types of impact where there was a certain residual element of risk.

In extensive experimentation with aerosol bottles coated with perforated elastic sheathing as described in said prior application, it has been determined that when a bottle is dropped and broken in a manner to produce a flying glass hazard this has frequently been the result of simultaneous impact against the floor or ground of elements of the bottle forming a continuous area or straight or curved line constituting a ridge of substantial extent. Where the bottle has one or more line ridges, for example, a seam of substantial length may be opened up along the ridge to release flying glass if the bottle falls in such a manner as to cause simultaneous impact of a substantial length of the ridge with the floor or ground. An important object and feature of the invention has been to provide a bottle in which this danger is avoided.

Another situation in which a similar problem has been encountered has been that in which the bottle has been dropped bottom side up, with resulting breaking off of the neck and opening up of the crimped connection between the depending sleeve of the dispensing valve and the underlying upper end of the plastic sheathing, and a further object and feature has been to provide a bottle avoiding this danger.

In brief, these dangers are avoided in practice of the present invention by coating the bottle, at the critical areas in question, with an organic adhesive which becomes bonded to the bottle when it sets. After application of the adhesive, and preferably after it has been set to provide a tough film of adhesive upon the bottle exterior, the bottle is further coated, e.g. by dipping or spraying, with a further organic coating which adheres to the adhesive coating previously applied in areas which have been previously coated, but which forms an elastically expansible non-adherent sheathing over the remainder of the bottle. This elastically expansible sheathing is then preferably perforated at a plurality of points spaced from the critical areas provided with the composite coating, and the bottle is then filled with the aerosol liquid and closed by application of the dispensing valve at the top of the bottle in sealed relation to the bottle top and to the sheathing.

Still further objects and features of the invention will be evident from reading tof the following detailed description in the light of the attached drawing, in which, Figure 1 is an elevational view of a glass bottle fabricated in accordance with the invention, Figure 2 is an enlarged vertical cross section through the neck and upper part of the bottle of Figure 1, with parts broken away, Figure 3 is a similar cross section through the bottom of the bottle, Figure 4 is a cross section on the line 4—4 of Figure 1 and Figure 5 is a perspective view illustrating practice of the invention on a slightly different form of bottle.

As illustrated in Figures 1 and 2 of the drawing, the glass container to which the invention is applied may be a bottle 10 having a neck portion 11 and a bottom portion 12 interconnected by wall portions which may be of circular or other desired cross section and which may taper in such a way as to form a narrow waist 13 intermediate the length of the bottle. When such a bottle is coated with an elastically expansible sheathing, as taught in the aforesaid West application, and this sheathing is perforated to provide vent holes and the bottle thereafter filled and sealed by securement of the dispensing valve in fluid-tight relationship to the bottle top and sheathing, this will provide protection against the hazard of flying glass in connection with almost every type of accident to which the bottle may be subjected. If, however, the bottle is dropped so that a ridge or area of substantial length or surface area strikes the ground or floor simultaneously this may cause such a large break in the plastic sheathing at the same time that the glass is broken that the sheathing is opened up to an extent permitting the glass to be projected through this opening with explosive force before the openings provided in the sheathing for that purpose have had an opportunity to vent the pressurized aerosol vapor and render it harmless as a propellant.

The same kind of a problem may exist if the top of the bottle is the first portion which strikes the floor, so that the neck of the bottle is substantially shattered.

In the following discussion, we shall refer to the neck, ridge and area portions of the bottle which present problems of this kind as the "critical areas" of the bottle. In the practice of the present invention, these areas are coated with a synthetic resin precursor which is cured to provide a tough film of the resulting plastic composition in adhesive relationship to the exterior surface of the bottle. The remaining portions of the bottle exterior are coated with a resin precursor of a different kind, which does not adhere to the surface of the bottle, and which forms an elastically expansible sheathing about the portions of the bottle which are not coated with the adherent film. In preferred practice of the invention, this elastically expansible sheathing composition is applied to the entire exterior surface, including that which has already been coated with the adhesive composition to provide the adherent reinforcement in the critical areas. By choosing, as the subsequently applied coating, a matereial which has the property of forming an elastically expansible sheathing where it overelies the glass portions of the bottle directly, but which is compatible with the adhesive coating first applied at the critical areas, it is possible to produce, by a dipping operation, a unitary film over the entire surface of the bottle, this film being adhesively joined to the bottle where it overlies the originally applied adhesive film, but being elastically expansible away from the bottle at other regions.

As illustrated in Figure 2 of the drawing, the bottle 10 is first coated at its critical neck portion 11 with an adhesive film 14 which becomes bonded strongly to the bottle when it sets, and a similar film is applied across the bottom ridge 15 of the bottle, as illustrated at 16. There is thus formed, at these regions, a reinforcing casing which adheres to the bottle, and which prevents expansion of any crack or break which may occur in the portion of the bottle surrounded by this coating from progressing to a size which would permit ejection of broken glass from the interior of the bottle. The coating applied at these regions 14 and 16 may be formed of any material having the desired toughness and adhesiveness to the bottle, but the preferred coating for use in this connection is a synthetic rubber adhesive made by E. I. du Pont de Nemours Company and sold under the trade name of Adhesive #467.

After the adhesive coating has been applied and preferably set at the areas indicated by reference numerals 14 and 16, a further coating 17 may then be applied about the entire exterior of the bottle. This coating may be a plastisol composition containing a finely milled vinyl chloride resin, a plasticizer such as di-isooctyl phthalate or tricresyl phosphate and other desired ingredients to provide a coating which adheres to the previously applied synthetic rubber adhesive but does not adhere to the remaining portions of the bottle, but merely forms an elastically expansible sheathing thereabout. After both coatings have been applied and cured, perforations 18 are formed in the portion of the elastically expansible sheathing 17 which does not overlie the coatings 14 and 16.

As the result of formation of these small perforations through the portion of the elastically expansible sheathing 17 which is not bonded to the coating 14 or 16, the volatile contents of the bottle will be permitted to escape through these openings in case of breakage of the glass portions of the bottle surrounded by the elastic portion of the sheathing.

From the foregoing discussion, it will be seen that the provision at the critical areas of a reinforcing film adhering to the bottle prevents any breakage of the glass in these areas from developing to a magnitude presenting a flying glass hazard, and that the provision of an elastic sheathing surrounding the remaining portions of the bottle insures that any broken glass contained within these elastic portions of the casing will be retained within the casing instead of being ejected. After the bottle has been encased over its main body and neck portions with the sheathing elements 14, 16 and 17, it is of course filled with the desired aerosol composition, and the dispensing valve 19 is applied. While this valve may be of any form adapted to fulfill the functions of containing the aerosol composition and dispensing it as desired, it must be interlocked with the sheathing portions discussed above, and this is preferably accomplished through a depending flange 22 which is spun or crimped inwardly as indicated at 23 to interlock it with the upper end of the sheathing 17, as the final act of assembly.

The invention has been illustrated in Figures 1–4 in its application to a bottle of circular cross section. It may of course be applied to various shapes of bottles or other glass containers, and it is illustrated in Figure 5 in its application to a bottle 30 of oblong cross section. Except for this difference of shape, the invention may be applied to the bottle of Figure 5 in substantially the same way as to that of Figures 1–4, the portions adjacent to critical ridges 31 including the bottom and side walls at opposite sides of these ridges being coated with an adherent adhesive or resin as indicated at 32 and the neck portions indicated at 33 being similarly coated. After the coatings at these portions have been formed, the final coating 34 is applied to the entire exterior surface of the bottle including the portions already coated with the adhesive composition. There is thus formed a tough laminated adherent coating at 32 and 33, and an elastic non-adherent coating at the remaining parts of the bottle. When the bottle is thereafter perforated at the points 35, and the dispensing valve 36 is applied, it will have the same advantages discussed above in relation to the embodiment of Figures 1–4 of the drawing.

While the invention has been described primarily in relation to a single preferred form, persons skilled in the art will be aware that it may be modified or refined in various ways within its general scope. We therefore wish it to be understood that this invention is not to be limited in interpretation except by the scope of the following claims:

We claim:

1. A container adapted to contain a product under pressure to be dispensed in aerosol form comprising a frangible bottle having a discharge opening, an organic adhesive bonded to exterior portions of said bottle, a continuous sheath of elastically expansible plastic material freely overlying substantially the entire exterior surface of the bottle, and being bonded only to said organic adhesive, said sheath being elastically expansible where freely overlying said bottle by said pressure when released upon explosive fracture of the bottle, said sheath having tensile and tear strengths to withstand the initial explosive force and when expanded having tensile and tear strengths operable within the elastic limit of said sheath to confine and retain said pressure and the fracture fragments of the bottle, and said sheath having at least one vent therein operable upon expansion of said sheath to gradually exhaust said pressure therefrom while still retaining therein the fracture fragments of said bottle.

2. A container as claimed in claim 1, said bottle having at least one linear ridge, said container being coated with said organic adhesive at and adjacent said ridge.

3. A container as claimed in claim 1, said bottle being coated with said organic adhesive adjacent said discharge opening.

References Cited in the file of this patent

UNITED STATES PATENTS

| 844,543 | Schenck | Feb. 19, 1907 |
| 1,969,397 | Dunkel | Aug. 7, 1934 |
| 2,563,508 | Anschucks | Aug. 7, 1951 |
| 2,565,954 | Dey | Aug. 28, 1951 |
| 2,754,237 | Brooks | July 10, 1956 |
| 2,756,105 | Magill | July 24, 1956 |

FOREIGN PATENTS

| 345,758 | Great Britain | Apr. 2, 1931 |

UNITED STATES PATENT OFFICE

CERTIFICATE OF CORRECTION

December 15, 1959

Patent No. 2,917,197

William S. Glover et al.

It is hereby certified that error appears in the printed specification of the above numbered patent requiring correction and that the said Letters Patent should read as corrected below.

Column 1, line 51, for "line ridges" read -- linear ridges --; column 3, line 2, for "matereial" read -- material --; line 4, for "overelies" read -- overlies --; line 28, for "Adhesive #467" read -- Adhesive #4678 --.

Signed and sealed this 31st day of May 1960.

(SEAL)
Attest:

KARL H. AXLINE
Attesting Officer

ROBERT C. WATSON
Commissioner of Patents